July 31, 1945.  F. R. McFARLAND  2,380,770
VIBRATION DAMPER
Filed Nov. 18, 1942

INVENTOR.
Forest R. McFarland
BY
Sibbetts & Hart
Attorneys.

Patented July 31, 1945

2,380,770

UNITED STATES PATENT OFFICE 2,380,770

VIBRATION DAMPER

Forest R. McFarland, Huntington Woods, Mich., assignor to Packard Motor Car Company, Detroit, Mich., a corporation of Michigan Application November 18, 1942, Serial No. 466,003

13 Claims. (Cl. 74—574)

This invention relates to vibration damping devices, and more particularly to devices for damping vibrations induced in engine crankshafts as the result of periodic torque impulses applied thereto.

An object of the invention is to provide a vibration damping device in which damping friction is regulated through means of an elastic pressure device.

A further object of the invention is to provide a compact, simple damping device in which an inertia member is influenced elastically and frictionally to control shaft vibrations occurring at different speeds.

A further object of the invention is to provide, in a vibration damping device, two or more rubber control means of differing characteristics.

Other objects of the invention will appear from the following description taken in connection with the drawing, which forms a part of this specification, in which.

Figure 1:
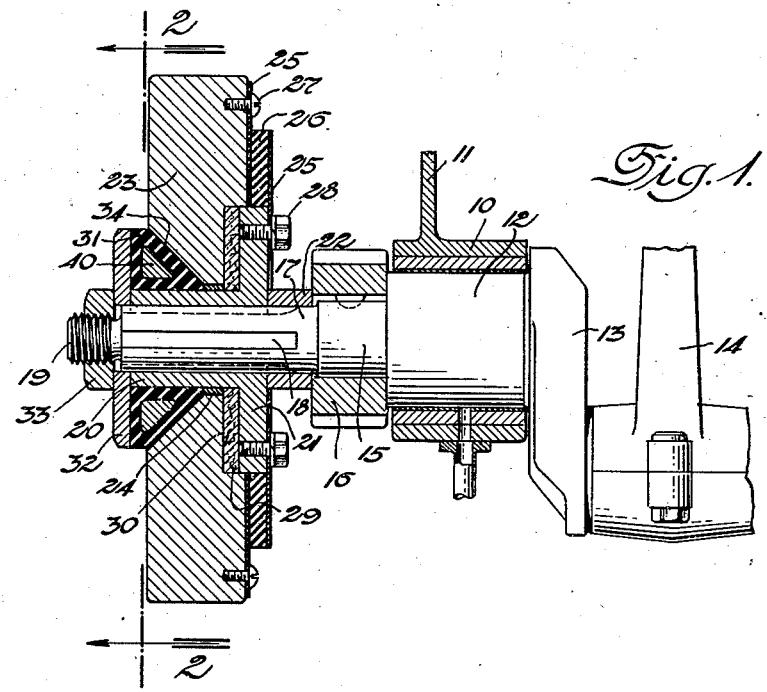
Fig. 1 is a vertical, longitudinal section through a portion of an internal combustion engine having a vibration damper constructed in accordance with the invention.
Figure 2:
Fig. 2 is a sectional view of the damper taken on line 2—2 of Fig. 1.

The crankshaft and associated flywheel of an internal combustion engine constitute a torsionally elastic system which will vibrate when applied periodic impulses are in synchronism with its natural frequency. At certain speeds of the shaft, called critical speeds, its natural period is equal to the period of impressed torque, or some harmonic component thereof, so that this force will build up elastic energy in the shaft. Thus, a condition of resonance is produced and torsional vibration of greater or less severity is the result.

For the control of such vibrations, various forms of means have heretofore been proposed which depend upon damping or the dissipation from the vibrating system of sufficient energy to prevent resonant growth of the disturbance. Such devices usually operate by friction and elastic means arranged between an inertia or weight member and the crankshaft. In some cases it has been found difficult to provide such means adapted to satisfactorily damp all of the vibratory periods within the engine range, especially since these occur at widely separated speeds and with considerably different intensities. Also, the vibrations occurring at the higher shaft speeds require for their control or elimination a greater amount of friction or the dissipation of a greater amount of energy than do the vibrations at the lower speeds.

The present invention contemplates a device in which the frictional force for damping torsional vibration is increased by weight members responsive to centrifugal force and acting through a wedging device that will not bind or stick.

Referring to the drawing, 10 represents a bearing carried by a wall 11 of an internal combustion engine. An end portion 12 of crankshaft 13 is mounted in the bearing and a connecting rod 14 is shown pivoted on the end crank of the crankshaft. The crankshaft extends in the form of a reduced portion 15 which has a gear 16 keyed thereto to drive an engine accessory. A further reduced extension portion 17 of the crankshaft is formed with splines 18 and the extreme end 19 is threaded.

A vibration damping device is mounted on the splined portion 17 of the crankshaft and has a carrier consisting of spaced disks 21 and 32 fixed to rotate with the crankshaft. Disk 21 extends as a flange from one end of a sleeve or hub 20 splined on the shaft and disk 32 surrounds the shaft at the end of the hub remote from disk 21. Between this flanged hub end and the gear 16 is a spacer ring 22 and a nut 33 on the end of the shaft retains the parts in position thereon.

An inertia member or flywheel 23 is journalled on a bearing ring 24 on the hub 20 between the flanges 21 and 32. This flywheel is connected with the hub by an elastic means consisting of a rubber disk 26 between and surface-bonded to thin metal disks 25. One of the metal disks is secured to the flywheel as by screws 27 and the other is secured to the hub flange as by bolts 28. This elastic means on one side of the flywheel permits limited relative rotation of the hub and flywheel. Further control of this relative rotation is provided by a friction means shown in the form of a disk 30 in a recess 29 in the flywheel 23. This disk 30 is mounted between and engages the flywheel and the hub flange 21.

Pressure transmitting means is provided to automatically vary the application of friction for controlling relative oscillation or rotation of the flywheel on the shaft. Such means consists of a load or pressure transmitting member, which can be in the form of a rubber ring 31, arranged between and engaging the flywheel and the disk 32. Ring 31 is preferably formed substantially as a right-angled triangle in cross section. The hypothenuse of the triangle faces the flywheel which is formed with an adjacent surface 34 extending at a similar angle therewith. The hub 20 and spacer 22 are preferably so dimensioned that the disk 32 will hold the rubber ring under pressure against the flywheel and thereby set up an initial frictional engagement of disk 30 with the hub flange and the flywheel.

The rubber ring 31 at one side of the flywheel and the elastic connector 26 at the other both act elastically to damp crankshaft vibrations. Ordinarily such vibration damping arrangement will be more effective in the lower crankshaft speeds. It is proposed to further control the damping of crankshaft vibration by the use of inertia means, in the form of weight members 40, having the pressure transmitting means arranged between them and the adjacent disk 32 and the flywheel. In the present showing, the weight members 40 are segmental in shape and are embedded in the rubber ring 31 and preferably surface-bonded thereto. These weight members are spaced annularly and conform in cross section to the ring in which they are embedded, but, of course, are of smaller dimensions.

When the damping device is assembled, nut 33 will hold disk 32 against hub 20 and the hub against the spacer 22 so that they are all held stationary in an axial direction. The arrangement is preferably such that the rubber ring will be compressed in an axial direction holding the disk 21 and the flywheel in pressure engagement with friction disk 29. The rubber ring will be held under sufficient pressure in an axial direction so that the surfaces thereof engaging the disk 32 and the flywheel can not shift relative thereto when there is relative rotation of the flywheel and the carrier means. The rubber ring 31 and the rubber disk 26 provide a pair of rubber means controlling relative rotation of the flywheel and the carrier, and the friction disk 29 is enclosed in the flywheel and carrier structure between such pair of rubber means.

Figure 3:
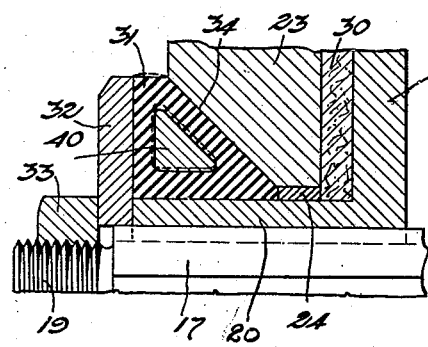
Fig. 3 is an enlarged fragment of the damper shown in Fig. 1, illustrating the weight members and their range of movement in the pressure ring.

The segmental inertia members will shift radially in the rubber ring in relation to the rotative speed of the crankshaft and will distort the rubber ring, as shown in dotted lines in Fig. 3, to transmit a variable wedging pressure against the flywheel to control the pressure relation thereof with the friction disk 29. As the rubber ring will distort by shifting of the segmental inertia members and will develop no rubbing friction therewith during such movement there will be no binding or sticking of the members in any position they assume within their shiftable range. Thus movement of the inertia members in applying wedging pressure to control the friction developed in the damping device will always be responsive to the effect of centrifugal force.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A vibration damper for a shaft comprising a pair of spaced disks fixed to the shaft, a flywheel between the disks, friction means between one disk and the flywheel, rubber means between and engaging the other disk and the adjacent portion of the flywheel, inertia means acting against the rubber means to vary the pressure relation of the flywheel against the friction means proportional to speed, and means definitely limiting the relative rotation of the flywheel and disks.

2. A vibration damper for a shaft comprising a carrier having spaced disks fixed on the shaft, a flywheel between the disks, friction means between one of the disks and a face of the flywheel, a rubber ring engaging the other disk and the adjacent face of the flywheel, and pressure creating means acting on the rubber ring to engage the flywheel with the friction means, the pressure being such that the rubber ring will be distorted but the surfaces of said ring engaging the disk and flywheel will not shift relative thereto.

3. A vibration damper for a shaft comprising a carrier fixed on the shaft having a pair of spaced radial disks, a flywheel journalled on the carrier, a friction disk between one side of the flywheel and one disk, a rubber ring engaging the other side of the flywheel and the adjacent disk, said ring being formed with an inclined face engaging the adjacent side face of the flywheel, and a plurality of segmental inertia members embedded in said ring, said members being similar to the ring in cross sectional shape and acting to distort the ring in response to centrifugal force to vary the engaging pressure of the flywheel against the friction disk in accordance with the speed of shaft rotation.

4. A vibration damper for a shaft comprising a member fixed to rotate with the shaft, a flywheel journalled coaxially with the shaft, friction means between the member and the flywheel, a rubber ring secured in compression against the flywheel to engage the friction means with the member and the flywheel, and segmental weight members embedded in the rubber ring, said members shifting their position in the ring in response to shaft speed to vary the pressure engagement of the friction means with the flywheel and the member.

5. A vibration damper for a shaft comprising a carrier fixed to the shaft, a flywheel journalled on the carrier, friction means acting to retard relative rotation of said flywheel and carrier, a rubber pressure ring engaging the flywheel with the friction means with such pressure that in the operation of the damper the surfaces of the rubber ring cannot shift relative to the flywheel and carrier and means shiftable in the ring in response to centrifugal force to vary the pressure exerted thereby against the flywheel.

6. A vibration damper for shafts comprising a hub member, an inertia member, friction means between said members retarding the rotation of one relative to the other, and rubber means at each side of and closing access to said friction means and tending to control the operating degree thereof.

7. A vibration damper for shafts comprising a hub member, an inertia member, friction means between said members retarding the rotation of one relative to the other, rubber means at each side of and closing access to said friction means and tending to control the operating degree thereof, and means controlling the action of said rubber means by centrifugal force.

8. A vibration damper for shafts comprising hub means, inertia means, friction means between said hub and inertia means retarding the rotation of one relative to the other, and rubber means at each side of said friction means tending to control the operating degree thereof, one of said rubber means being secured to the hub means and inertia means respectively, the other of said rubber means being controlled in its action by centrifugal force.

9. A vibration damper for a shaft comprising a hub having a disk, a flywheel mounted adjacent said disk, friction means between said disk and said flywheel, and rubber means between said hub and said flywheel effecting pressure on the friction means and definitely limiting relative rotation between the hub and the flywheel.

10. A vibration damper for a shaft comprising a hub having a disk, a flywheel mounted adjacent said disk, friction means between said disk and said flywheel, rubber means between said hub and said flywheel effecting pressure on the friction means and definitely limiting relative rotation between the hub and the flywheel, and inertia means acting against a portion of the rubber means to vary the pressure of the friction means proportional to speed.

11. A vibration damper for shafts comprising a hub member, an inertia member, friction means between said members retarding the rotation of one relative to the other, and rubber means directly contacting said hub and flywheel and arranged on both sides of said friction means tending to control the operating degree of said friction means.

12. A vibration damper for shafts comprising a hub member, an inertia member, friction means between said members retarding the rotation of one relative to the other, and rubber means at each side of said friction means tending to control the operating degree thereof, said rubber means combining with the hub and inertia members to enclose the friction means.

13. A vibration damper for shafts comprising a hub member, an inertia member, friction means between said members retarding the rotation of one relative to the other, rubber means at each side of said friction means tending to control the operating degree thereof, said rubber means combining with the hub and inertia members to enclose the friction means, and centrifugally operating means controlling the action of said rubber means.

FOREST R. McFARLAND.